(12) United States Patent
Larson

(10) Patent No.: US 9,330,430 B2
(45) Date of Patent: May 3, 2016

(54) FAST QUERIES IN A MULTITHREADED QUEUE OF A GRAPHICS SYSTEM

(75) Inventor: Michael K. Larson, Kirkland, WA (US)

(73) Assignee: Apple Inc., Cupertino, CA (US)

( * ) Notice: Subject to any disclaimer, the term of this patent is extended or adjusted under 35 U.S.C. 154(b) by 876 days.

(21) Appl. No.: 13/052,436

(22) Filed: Mar. 21, 2011

(65) Prior Publication Data

US 2012/0242672 A1    Sep. 27, 2012

(51) Int. Cl.
*G06T 1/20* (2006.01)
(52) U.S. Cl.
CPC ........................................ *G06T 1/20* (2013.01)
(58) Field of Classification Search
CPC .............. A63F 13/12; A63F 2300/407; A63F 2300/534; C12Q 1/6895; A61B 2017/00473; A61B 2017/00477; A61B 2019/2242; G06T 15/005; G06T 1/20; G06T 1/60; G06Q 30/00; G06Q 30/0222; G06Q 30/04; G06F 9/3885; G06F 9/3877; G06F 9/3851; G06F 9/3836
USPC ........................................................ 345/522
See application file for complete search history.

(56) References Cited

U.S. PATENT DOCUMENTS

| | | | |
|---|---|---|---|
| 5,319,753 A * | 6/1994 | MacKenna | .............. G06F 13/24 710/48 |
| 6,105,057 A | 8/2000 | Kuftedjian et al. | |
| 6,809,736 B1 | 10/2004 | Stauffer et al. | |
| 7,353,515 B1 | 4/2008 | Ton et al. | |
| 7,526,634 B1 * | 4/2009 | Duluk, Jr. | ................. G06F 9/52 712/216 |
| 7,764,289 B2 | 7/2010 | Stauffer et al. | |
| 2006/0095894 A1 | 5/2006 | Wilde et al. | |
| 2007/0088792 A1 * | 4/2007 | Piper | ....................... G06F 9/546 709/207 |
| 2007/0157200 A1 | 7/2007 | Hopkins | |
| 2009/0265528 A1 | 10/2009 | Du et al. | |

\* cited by examiner

*Primary Examiner* — Gregory J Tryder
*Assistant Examiner* — F. M. Hossain
(74) *Attorney, Agent, or Firm* — Blakely, Sokoloff, Taylor & Zafman LLP

(57) ABSTRACT

According to one aspect of the invention, a query request is received from a client application at a multithreaded graphics framework. The multithreaded graphics framework including a first thread configured to place graphics commands from the client application into a command queue and a second thread configured to dispatch the graphics commands from the command queue to a graphics processing unit (GPU) for execution. In response to the query request, the first thread is configured to store query information of the query request in a query block of memory that is separated from the command queue and notifying the second thread. In response to the notification, the second thread is configured to issue a query command to the GPU based on the query information retrieved from the query block, prior to dispatching remaining graphics commands pending in the command queue.

25 Claims, 5 Drawing Sheets

FAST QUERIES IN A MULTITHREADED QUEUE OF A GRAPHICS SYSTEM

FIELD OF THE INVENTION

Embodiments of the present invention relate generally to graphics processing systems. More particularly, embodiments of the invention relate to fast queries in a multithreaded queue of a graphics system.

BACKGROUND

Computer graphics refers to any processing device or program that makes a data processing system, such as a computer capable of displaying and manipulating (e.g., drawing, inputting, and outputting) graphics objects. Accordingly, processes of rendering information to be displayed may require a computer system have considerable memory and processing speed. Typically, a graphics processing unit ("GPU") is used to process graphics objects, which lifts the burden off the central processing unit ("CPU") which can then be used to perform other tasks.

In order to exploit multiple CPU threads, software can be written to use a producer consumer queue where one thread issues commands to a queue which are read by another thread for processing. This reduces the amount of time spent by a producer thread by dispatching the work to another thread. As commands are processed by a consumer thread, information is accumulated in data structures that are coherent with the consumer thread, but not with the producer thread. The producer thread often needs to retrieve information from the consumer thread or the GPU. However, since the queue may contain commands pending to be executed, the only way to ensure that the producer and consumer threads are synchronized is to ensure that the queue is empty and the GPU has completed all commands therein.

A conventional multithreaded graphics engine, such as Open Graphics Language or OpenGL™, forms a command queue between two threads. A producer thread can reside on the application main thread or in a drawing thread created by the application. A consumer thread is created along with the command queue (e.g., a first-in-first-out or FIFO queue). The command queue can contain many commands from the producer and is kept in synchronized using common mechanisms used in software FIFO's and queues. State queries in this architecture require the command queue to be emptied and the GPU to complete any commands dependent on this query. This can be a time consuming issue, as all the commands need to be processed by the consumer thread and finished by the GPU.

SUMMARY OF THE DESCRIPTION

Techniques for efficiently processing graphics query requests are described herein. According to one aspect of the invention, a query request is received from a client application at a multithreaded graphics framework. The multithreaded graphics framework including a first thread configured to place graphics commands from the client application into a command queue and a second thread configured to dispatch the graphics commands from the command queue to a graphics processing unit (GPU) for execution. In response to the query request, the first thread is configured to store query information of the query request in a query block of memory that is separated from the command queue and notifies the second thread. In response to the notification, the second thread is configured to issue a query command to the GPU based on the query information retrieved from the query block, prior to dispatching remaining graphics commands pending in the command queue.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
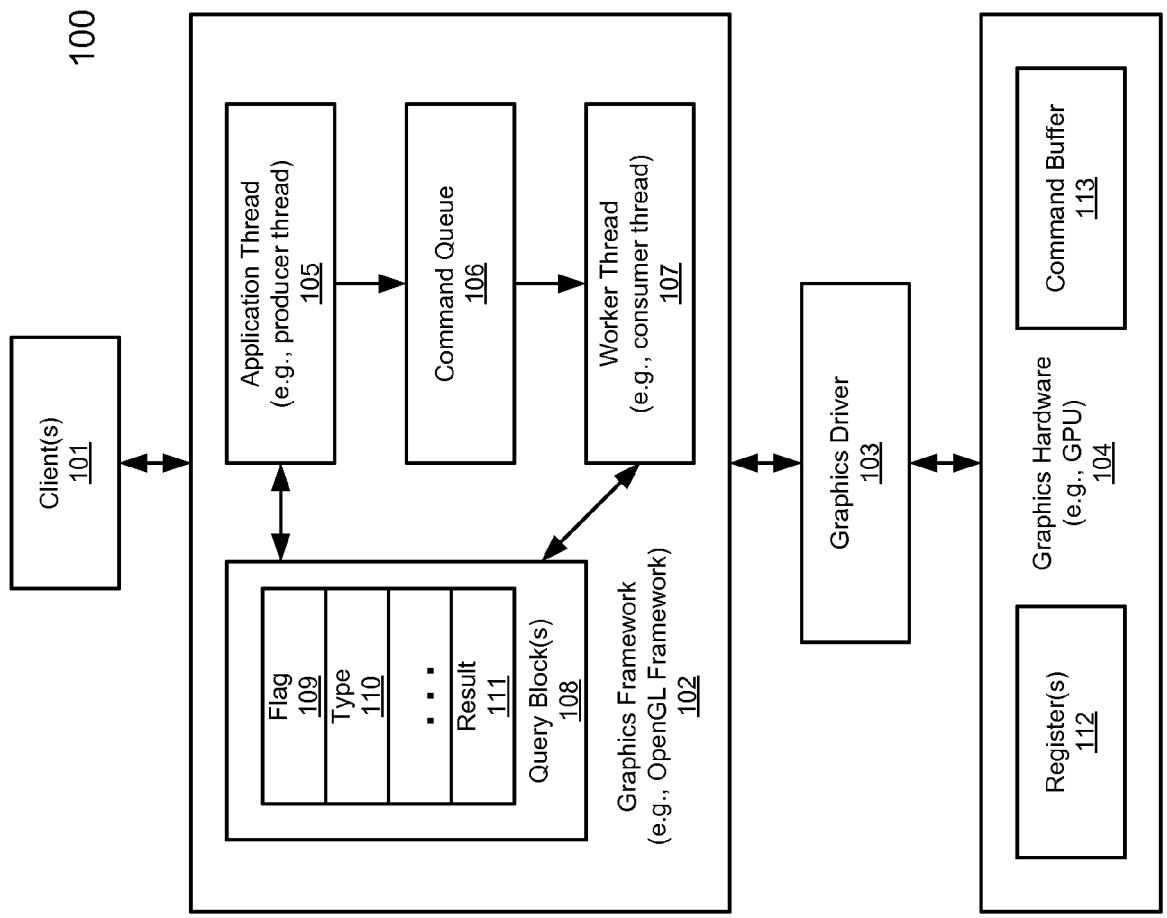
FIG. 1 is a block diagram illustrating a graphics system according to one embodiment of the invention.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Accordingly, embodiments of the invention do not require complete flush of a command queue and only require a GPU to complete the commands up to the desired query. This reduces the amount of time to retrieve information back from a consumer thread and/or the GPU by reducing substantial work by the consumer thread and/or the GPU for a query. According to some embodiments, a synchronization command is issued after each command that produces critical information that requires fast access such as an occlusion query. The synchronization command is used to determine exactly where in a command stream to the GPU the query command is located and if the result can be retrieved without completing the entire command buffer sent to the GPU.

In one embodiment, in response to a query request received from a client application via an application programming interface (API) of a multithreaded graphics framework, a fast query can be performed by a producer thread of the graphics framework by issuing a query request in a designated query block of memory that is separated from the command queue. Once the query request has been placed in the query block, the producer thread sets a flag in the query block to a predetermined value indicating that a query request is pending and notifies a consumer thread of the graphics framework. Thereafter, the producer thread may wait for the query result, perform other tasks, or transition into a sleep state until the query result is ready.

In response to the notification, the consumer thread retrieves the query request from the query block and issues a query command based on the query request to a graphics driver which places the query command in a command buffer of a GPU that executes the query command. In one embodiment, the query command is issued by the consumer thread without having to dispatch the remaining graphics commands pending in a command queue. That is, the query command is issued bypassing the remaining graphics commands in the command queue. In addition, according to one embodiment, after issuing the query command, the consumer thread also issues a synchronization command to the GPU, where the synchronization command is associated with a synchronization object. Thereafter, the consumer thread can either wait for the query command to be executed by the GPU, perform other tasks, or transition itself into a sleep state until the query command has been executed by the GPU.

When the GPU finishes execution of the synchronization command after executing the query command, in one embodiment, the consumer thread is notified by the GPU via the synchronization object. In response to the notification, the consumer thread retrieves the query result from the GPU and stores the query result in the query block that is shared between the consumer thread and the producer thread. Thereafter, the consumer thread sets the flag of the query block to a predetermined value, which in turn notifies or wakes up the producer thread regarding availability of the query result. The producer thread can then retrieve the query result from the query block and return the query result to the client. As a result, a query command can be executed without having the GPU finish the graphics commands remaining in the command queue, which literately puts the query command in a "fast lane" for execution.

FIG. 1 is a block diagram illustrating a graphics system according to one embodiment of the invention. System 100 includes one or more client applications 101 communicatively coupled to graphics framework 102 to perform graphics operations by issuing graphics commands to graphics hardware 104 via graphics driver 103. Applications 101 may be any kind of applications that produce graphics objects to be rendered by graphics hardware 104. For example, application 101 may be a video game, a drawing application (e.g., spreadsheet), or a computer-aid design (CAD) software. Client 101 can communicate with graphics framework 102 via a variety of graphics application programming interface (API), such as, for example, OpenGL™ API from Khronos Group or DirectX™ API from Microsoft Corporation.

Graphics framework 102 may be implemented as part of an operating system (OS) running within a data processing system, where the operating system may be any kind of operating system, such as Windows™ operating system from Microsoft, Mac OS™ from Apple Inc, a LINUX or UNIX operating system, etc. For example, graphics framework 102 may be executed as part of an operating system in a system memory by a central processing unit (CPU) (not shown), where the CPU may include one or more processors or processor cores. Graphics hardware 104 may include one or more GPUs and a video memory. Graphics hardware 104 may be integrated within a chipset of the data processing system such as an IO (input/output) bridge (also referred to as a south bridge), where the video memory may be specifically allocated from the system memory. In such a configuration, graphics driver 103 may be executed in the system memory by the CPU, for example, in a kernel space of the operating system. Alternatively, graphics hardware 104 may be implemented as a dedicated graphics acceleration device coupled to the CPU and system memory via a variety of buses, such as, for example, an accelerated graphics port (AGP) bus, a peripheral component interconnect (PCI) bus, or a PCI-Express bus, etc. In this configuration, graphics driver 103 may be executed by graphics hardware 104.

In one embodiment, graphics framework 102 is a multi-threaded graphics framework that provides one or more APIs (e.g., OpenGL™ or DirectX™) to clients 101, where clients 101 may be executed in one or more threads by one or more processors or processor cores of a CPU. Graphics framework 102 includes application thread 105, command queue 106, and worker thread 107. Graphics commands received from clients 101 via the APIs are placed or packed into command queue 106 by application thread 105. On the other hand, worker thread 107 is configured to retrieve or unpack the graphics commands from command queue 106 and dispatch the graphics commands to graphics driver 103, where the dispatched graphics commands are placed in command buffer 113 to be executed by graphics hardware 104 (e.g., one or more GPUs). Certain statuses of operations of graphics hardware 104 can be retrieved by reading from one or more registers 112 of graphics hardware 104.

In one embodiment, application thread 105 and worker thread 106 are executed by the CPU in a multithreaded operating environment (e.g., multithreaded ready operating system) and they are running independently. In this configuration, with respect to command queue 105, application thread 105 operates as a producer thread that is responsible to produce or insert graphics commands into command queue 106, while worker thread 107 operates as a consumer thread to consume or retrieve graphics commands from command queue 106 to be dispatched to graphics hardware 104 via graphics driver 103. Command queue 106 may be specifically allocated from the system memory and shared by application thread 105 and worker thread 107.

In addition, according to one embodiment, graphics framework 102 further includes query block 108 for query operations, where query block may be a block of memory specifically allocated from system memory and shared between application thread 105 and worker thread 107. However, such a query block is separated from command queue 106 and is specifically used for handling query operations for querying states or statuses of graphics hardware 104 (e.g., results of execution of specific graphics commands). Query block 108 may be allocated per application thread 105 or alternatively, query block 108 may be allocated per clients 101. In one embodiment, query block 108 includes one or more fields 109-111 to allow application thread 105 and worker thread 107 to communicate with each other for query purposes, in addition to normal downstream communications of graphics commands via command queue. That is, command queue 106 is a one-way downstream communication channel for sending down graphics commands for execution by graphics hardware 104, while query block 108 is a two-way communication channel between application thread 105 and worker thread 107.

In one embodiment, when there is a need to query information from graphics hardware, client 101 transmits a query request to graphics framework 102 via a proper API (e.g., OpenGL or DirectX). In response to the query request, application thread 105 (e.g., a first thread or producer thread) places the query information in query block 108 based on the query request. Once the query request has been placed in query block 108, application thread 105 notifies, via the operating system, worker thread 107 (e.g., a second thread or a consumer thread) that a query request has been placed in query block 108. Thereafter, application thread 105 may wait for the query result, perform other tasks, or transition into a sleep state until the query result is ready.

In response to the notification, worker thread 107 retrieves the query request from query block 108 and issues a query command based on the query request to a graphics driver which places the query command in command buffer 113 of graphics hardware 104 that executes the query command. In one embodiment, the query command is issued by the consumer thread without having to dispatch the remaining graphics commands pending in command queue 106. That is, the query command is issued bypassing the remaining graphics commands in command queue 106.

When graphics hardware 104 finishes execution of the query command, in one embodiment, the consumer thread 107 is notified by graphics hardware 104. In response to the notification, consumer thread 107 retrieves the query result from registers 112 of graphics hardware 104 and stores the query result in query block 108 that is shared between consumer thread 107 and producer thread 105. Thereafter, the consumer thread 107 notifies or wakes up producer thread 105 regarding the query result. Producer thread 105 can then retrieve the query result from query block 108 and return the query result to the client 101. As a result, a query command can be executed without having graphics hardware 104 finish the graphics commands remaining in command queue 106, which literately puts the query command in a "fast lane" for execution, bypassing the graphics commands pending in command queue 106.

Figure 2:
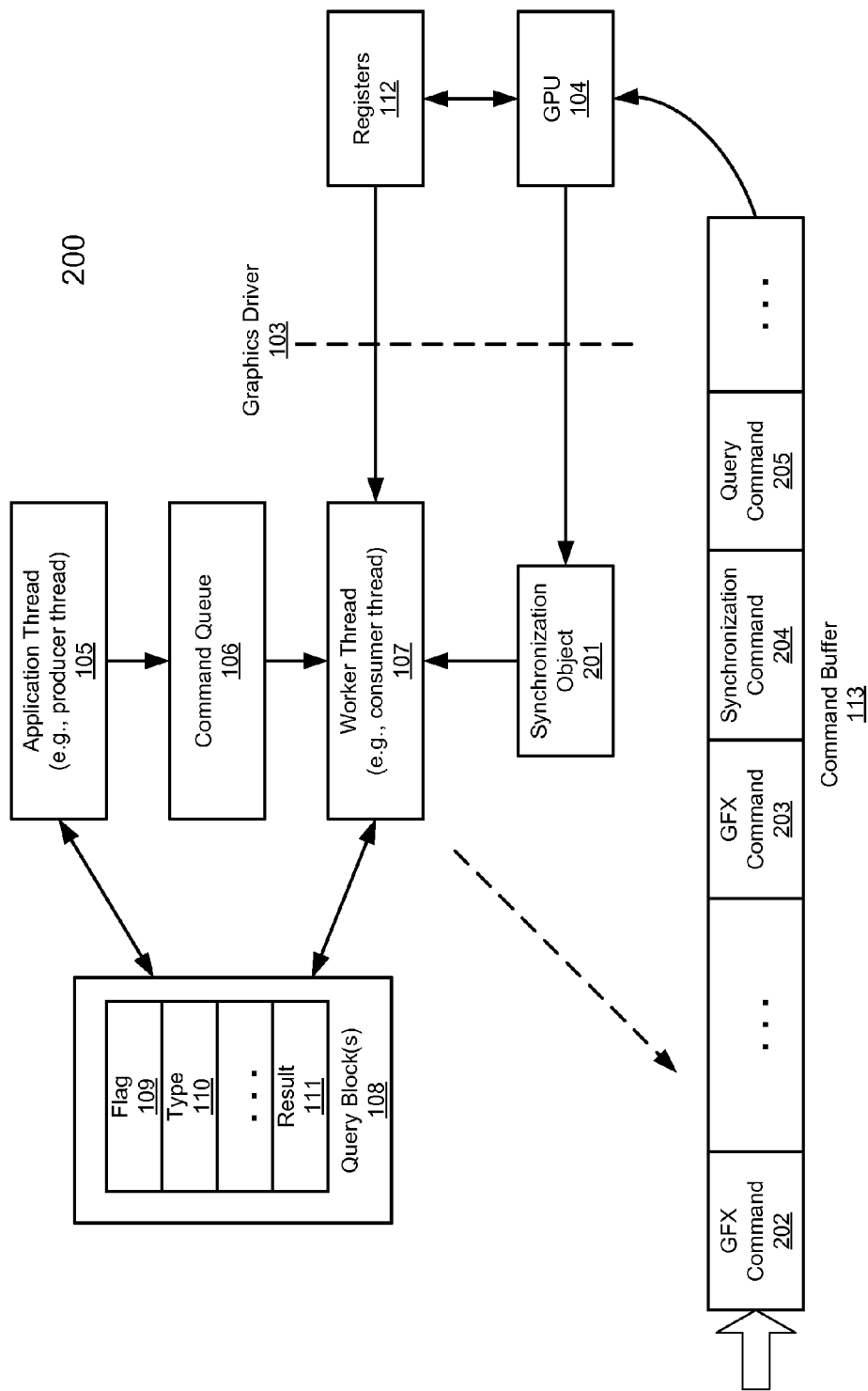
FIG. 2 is a block diagram illustrating a process of handling a query command in a graphics system according to one embodiment of the invention.

FIG. 2 is a block diagram illustrating a process of handling a query command in a graphics system according to one embodiment of the invention. System 200 may be implemented as part of system 100 of FIG. 1. Referring to FIG. 2, as described above, application thread 105 (e.g., a first thread), operating as a producer thread, is responsible for receiving graphics commands (e.g., draw commands) from a client via an API of a graphics framework (e.g., OpenGL™ or DirectX™ API) and placing the graphics commands in command queue 106, while worker thread 107 (e.g., a second thread), operating as a consumer thread, is responsible for retrieving and dispatching graphics commands from command queue 106 to command buffer 113 of GPU 104. Command queue 106 is a user space memory queue within the graphics framework, which may be allocated from the system memory. Command queue 106 may be a first-in-first-out (FIFO) queue. Command buffer 113 may be part of a local video memory associated with GPU 104 or a block of memory specifically allocated from the system memory and utilized by GPU 104 and/or graphics driver 103 which may be running at a kernel space of an operating system.

In one embodiment, when a query request is received from a client, application thread 105 is configured to place the query information of the query request in query block 108, including specifying a type of the query in type field 110 and other information. For example, information concerning a number of occlusions between a viewer and a light source or a number of GPU clock cycles to complete a particular operation involved in a query may also be included. Once the query information has been populated in query block 108, in one embodiment, application thread 105 sets flag 109 of query block to a predetermined value (e.g., a non-zero value) to indicate that there is a pending query request in query block 108. In addition, application thread 105 notifies or wakes up worker thread 107 concerning the pending query request. In some situations, if there is no graphics command pending in command queue 106 or command buffer 113 is full or some other conditions, worker thread 107 may enter into a sleep state or perform other tasks.

In one embodiment, application thread 105 may be woken up via a notification event or software interrupt issued by the operating system. In one embodiment, application thread 105 may insert a predetermined command (e.g., a dummy command) in command queue 106, which triggers a notification event or a software interrupt sent by the operating system to worker thread 107. Thereafter, application thread 105 may wait for the query request to be completed, enter into a sleep state, or perform other tasks. In one embodiment, application thread 105 may invoke a lock mechanism (e.g., spinlock, semaphore, or mutex, etc.) provided by the operating system for the purpose of waiting for the query request to be completed. For example, application thread 105 may acquire a spinlock on flag 109 via the operating system, where the value of flag 109 is utilized as a state of the spinlock indicating whether the corresponding spinlock has been acquired or released. Alternatively, a thread may be dispatched with the work items in the queue and the thread may process the queue or be dispatched to perform the query.

In response to the notification, according to one embodiment, worker thread 107 examines flag 109 of query block to determine whether there is a pending query request in the query block. Note that there may be multiple query blocks configured to support multiple clients, where there is a specific query block for each client. When worker thread 107 is notified, it has to examine each query block to determine which of the query blocks contains a pending query request. If it is determined that flag 109 has been set to a predetermined value, worker thread 107 examines type 110 to generate a query command associated with the specific type and issues the query command to graphics driver 103, which places the query command into command buffer 113, as query command 205. Command buffer 113 in general is a FIFO buffer having graphics commands 202-203 to be executed in a first-come-first-served order by GPU 104. Once the query command has been issued, worker thread 107 may wait, enter into a sleep state, or perform other tasks, until the query command has been executed. As a result, the query command is issued and executed without having to flush the remaining graphics commands in command queue 106. This literally puts the query command in a "fast lane" for execution, bypassing the pending graphics commands in command queue 106.

Once query command 205 has been executed by GPU 104, worker thread 107 is notified. In response, worker thread 107 retrieves the query result from registers 112 associated with GPU 104, where registers 112 may be hardware registers, software registers, or a combination of both. Worker thread 107 then populates the query result in query block 108 as part of query result 111. Once the query result has been populated into query block 108, worker thread 107 is configured to notify application thread 105 via the operating system. In one embodiment, worker thread 107 is configured to set flag 109 to a predetermined value (e.g., zero), which in turn notifies application thread 105. For example, application thread 105 may periodically read or poll flag 109 to determine whether the value of flag 109 has been changed as a way to determine whether the query result has been populated in query block 108. Thus, by setting the value of flag 109 to a different value by worker thread 107, application thread 105 is notified. Alternatively, application thread 105 may acquire a spinlock on flag 109 from the operating system, and by setting the value of flag 109 to a predetermined value such as a zero, worker thread 107 literally "releases" the spinlock, which in turn notifies application thread 105. In response to the notification, application thread 105 retrieves the query result from query block 108 and returns the query result to the client.

According to one embodiment, after issuing query command 205 to command buffer 113, worker thread 107 issues synchronization command 204. Synchronization command 204 is associated with synchronization object 201, which is used for notification purposes. In one embodiment, after issuing the synchronization command, worker thread 107 sets a predetermined field or member of synchronization object 201 to a predetermined value and waits for a change of the value of the predetermined field or member. Meanwhile, worker thread 107 may perform other tasks or simply enter a sleep state. Since command buffer 113 is a FIFO buffer, after executing query command 205 by GPU 104, GPU 104 executes synchronization command. In one embodiment, in response to the synchronization command, GPU 104 does not perform any graphics operation; rather, GPU 104 and/or graphics driver 103 sets the predetermined field or member of synchronization object 201 to a different value, which in turn notifies worker thread 107, for example, via an API by a synchronization server (not shown).

In one embodiment, a synchronization command, as well as a synchronization object, is utilize to serialize commands in multiple graphics command streams that access a common resource, where the synchronization is organized or managed by a synchronization server (not shown). Generally, a synchronization object is placed in the command stream at a point after which the command stream has completed its use of the common resource. For example, if the command stream A had four drawing commands using the common resource and three drawing commands not using the common resource, the synchronization object may be set in the command stream after the first four commands but before the last three commands. In this way, the command stream indicates through the synchronization object when commands related to the common resource have been completed.

A client, in this example, worker thread 107, can send via the API a request for a synchronization object test to the synchronization server requesting information as to whether or not the current state of the synchronization object indicates that commands in other command streams, in this example, graphics driver 103, that depend on the common resource have been completed. The synchronization server may reply to the request with an indication of whether the command stream may proceed with commands dependent on the common resource.

In one embodiment, the synchronization server may receive a notice generated by a processing device (e.g., GPU or graphics driver) performing the commands in command stream (e.g., GPU) has reached the synchronization object in the command stream. For example, a method associated with the synchronization object may be called by the processing device when the processing device encounters the synchronization object in the command stream. In response to the processing device calling the method associated with the synchronization object, the state of the synchronization object changes to indicate that the command stream has completed processing a set of commands dependent on the common resource.

When the synchronization server receives a synchronization object test from worker thread 107, if the GPU or graphics driver 103 has processed the synchronization object when the synchronization server receives the test, the synchronization server indicates to worker thread 107 that it may begin processing commands dependent on the common resource. If the GPU or graphics driver 103 has not processed the synchronization object when the synchronization server receives the test request, then the synchronization server responds to the test with an indication that worker thread 107 may not process commands dependent on the common resource corresponding to the synchronization object. A synchronization object may be globally allocated.

Figure 3:
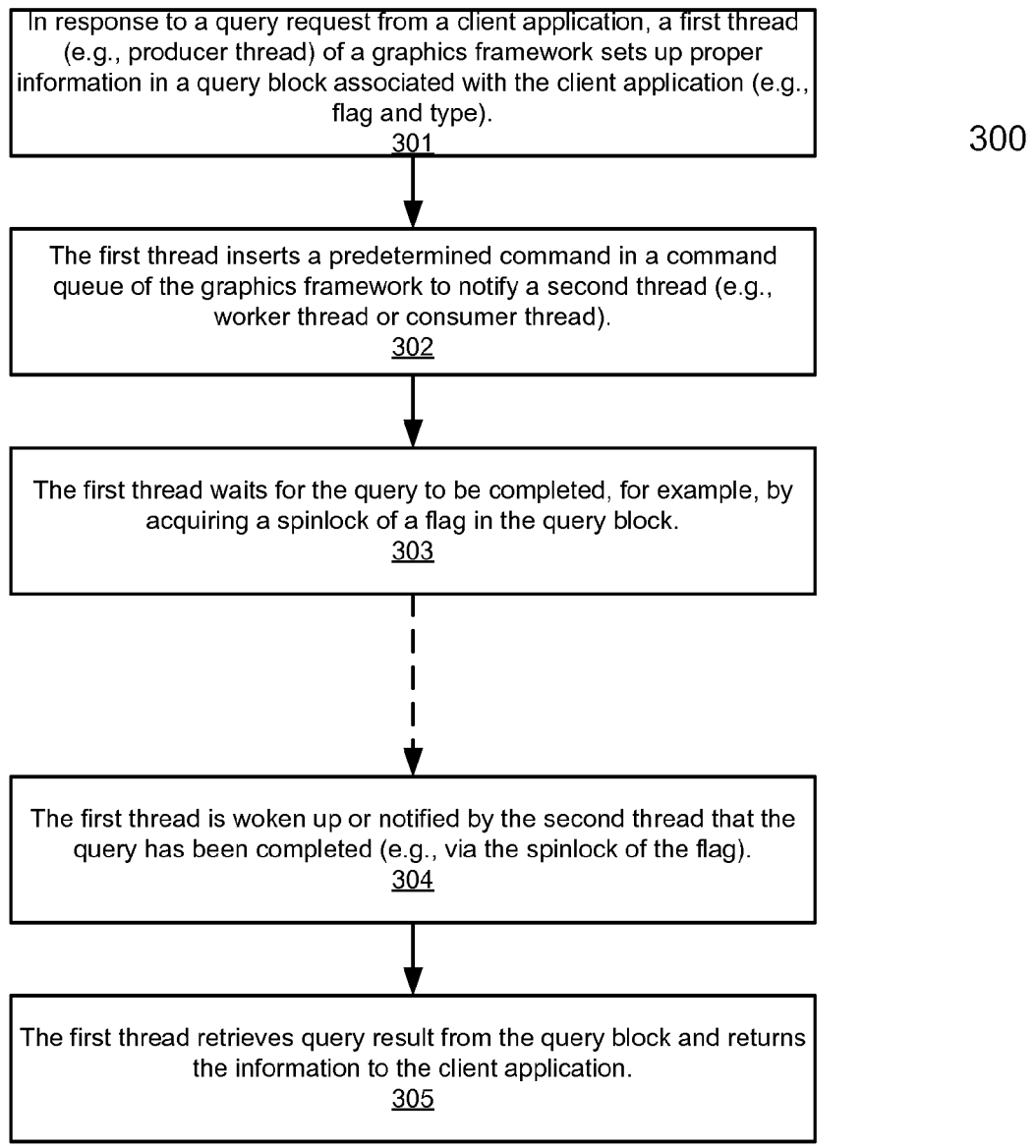
FIG. 3 is a flow diagram illustrating a method for processing a graphics query command according to one embodiment of the invention.

FIG. 3 is a flow diagram illustrating a method for processing a graphics query command according to one embodiment of the invention. For example, method 300 may be performed by application thread 105 of FIG. 1. Referring to FIG. 3, at block 301, in response to a query request received from a client application, a first thread (e.g., application thread or producer thread) of a graphics framework is configured to set up proper query information in a query block associated with the client application (e.g., flag, type). At block 302, the first thread notifies a second thread (e.g., worker thread or consumer thread), for example, by inserting a predetermined command into a command queue. Thereafter, the first thread waits for the query request to be completed, for example, by acquiring a spinlock of a predetermined field (e.g., flag) in the query block. Subsequently, at block 304, the first thread is notified or woken up by the second thread indicating that the query request has been completed and the query result has been placed in the query block. In response, at block 305, the first thread retrieves the query result from the query block and returns the information to the client application.

Figure 4:
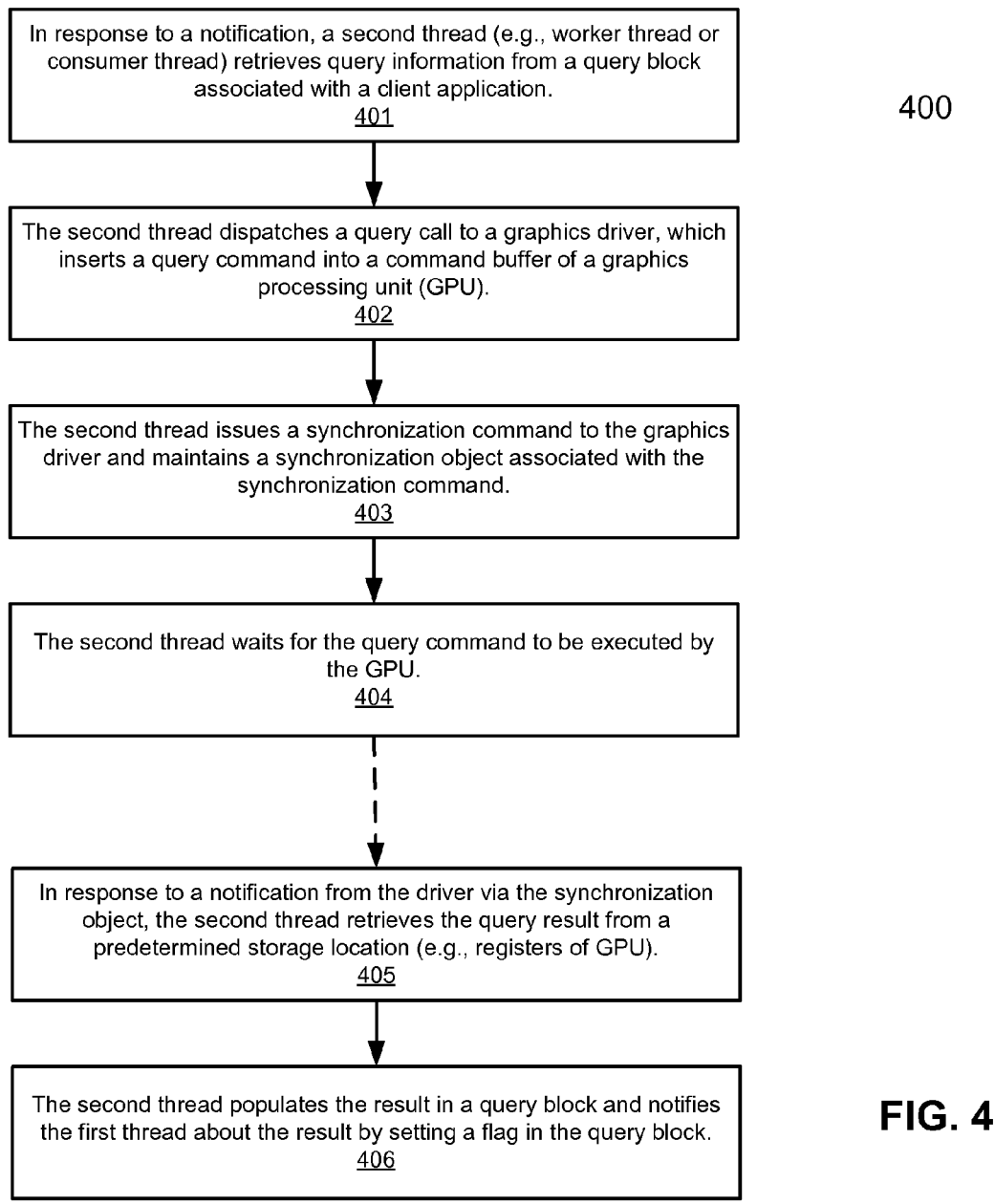
FIG. 4 is a flow diagram illustrating a method for processing a graphics query command according to another embodiment of the invention.

FIG. 4 is a flow diagram illustrating a method for processing a graphics query command according to another embodiment of the invention. For example, method 400 may be performed by worker thread 107 of FIG. 1. Referring to FIG. 4, at block 401, in response to a notification, a second thread (e.g., worker thread or consumer thread) is configured to retrieve query information from a query block associated with a client application, where the query information is placed by a first thread (e.g., application thread or producer thread). At block 402, the second thread issues a query command to a graphics driver, which places the query command into a command buffer of the graphics hardware such as a graphics processing unit (GPU). In addition, optionally at block 403, the second thread issues a synchronization command to the graphics driver and maintains a synchronization object associated with the synchronization command. At block 404, the second thread waits for the query command to be executed by the graphics hardware. Subsequently, at block 405, in response to a notification from the graphics driver via the synchronization object, the second thread retrieves the query result from a predetermined storage area (e.g., registers of graphics hardware). At block 406, the second thread populates the query result in the query block and notifies the first thread about the query result by setting a flag in the query block.

Figure 5:
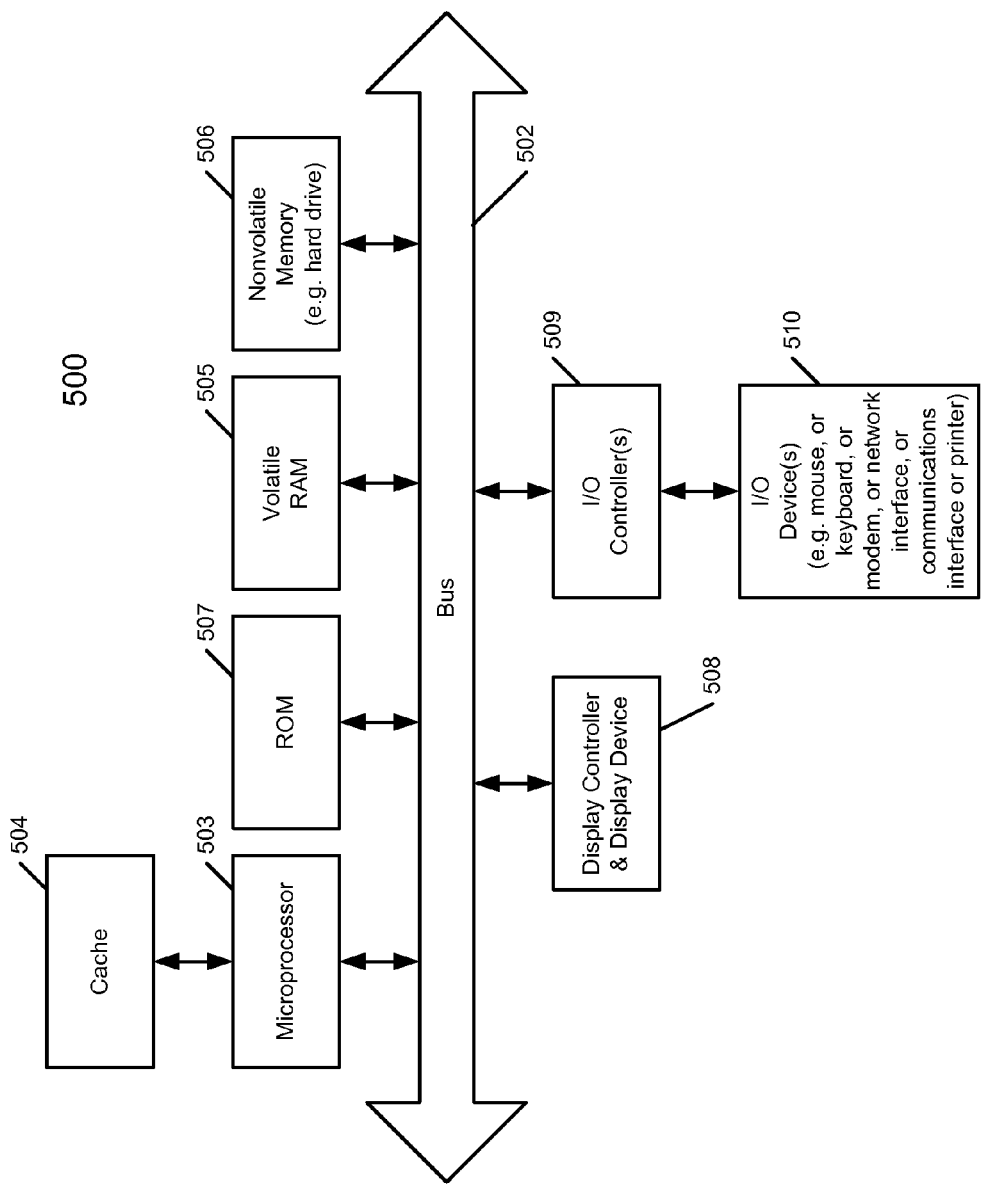
FIG. 5 is a block diagram of a data processing system, which may be used with one embodiment of the invention.

FIG. 5 is a block diagram of a data processing system, which may be used with one embodiment of the invention. For example, the system 500 may be used as part of system 100 of FIG. 1. Note that while FIG. 5 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 5 may, for example, be an Apple Macintosh computer or MacBook, an IBM compatible PC, or a computer server.

As shown in FIG. 5, the computer system 500, which is a form of a data processing system, includes a bus or interconnect 502 which is coupled to one or more microprocessors 503 and a ROM 507, a volatile RAM 505, and a non-volatile memory 506. The microprocessor 503 is coupled to cache memory 504. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing queries of a graphics system, the method comprising:
  receiving a query request from a client application at a multithreaded graphics framework, the multithreaded graphics framework including a first thread configured to place a plurality of graphics commands from the client application into a command queue and a second thread configured to dispatch the graphics commands from the command queue to a command buffer of a graphics processing unit (GPU) for execution;
  in response to the query request, the first thread storing query information of the query request in a query block of memory that is separated from the command queue, wherein the query request is to query an operating status of the GPU, wherein query information identifies a type of query associated with the operating status of the GPU to be queried;
  notifying the second thread that the query information of the query request has been stored in the query block;
  in response to the notification, the second thread retrieving the query information from the query block; and
  the second thread issuing a query command to the command buffer of the GPU based on the query information retrieved from the query block, prior to dispatching remaining graphics commands pending in the command queue, wherein the query command is executed by the GPU prior to executing the remaining graphics commands in the command queue.

2. The method of claim 1, wherein notifying the second thread comprises inserting by the first thread a predetermined command into the command queue, wherein the insertion of the predetermined command causes an operating system hosting the multithreaded graphics framework to send an event notification to the second thread.

3. The method of claim 2, wherein storing query information in the query block comprises:
  setting in a flag field a flag to a first predetermined value to indicate that the query request is pending to be completed; and specifying in a type field to indicate one of a plurality of types of query requests, wherein the query command is issued based on the type of the query request and the flag.

4. The method of claim 3, further comprising:

in response to the event notification, the second thread examining the flag of the query block to determine whether there is a pending query request;

in response to determining that the flag has been set to the first predetermined value, the second thread examining the type field of the query block to determine the type of query request; and generating the query command based on the type of query request.

5. The method of claim 3, further comprising:

acquiring by the first thread a lock on the flag of the query block from an operating system hosting the multithreaded graphics framework, wherein the first predetermined value of the flag indicates that the lock has been acquired by another thread; and configuring the first thread to perform other operations or to be in a sleep state, while waiting for the lock to become available which indicates that the query commend has been executed by the GPU.

6. The method of claim 5, further comprising:

in response to a notification from the GPU indicating that the query command has been executed, the second thread retrieving and placing a query result in a result field of the query block; and clearing by the second thread the flag in the query block to a second predetermined value to notify the first thread via the lock that the query result is available in the query block, to allow the first thread to retrieve the query result from the query block and return the query result to the client application, wherein the second predetermined value of the flag indicates to the first thread that the lock has been released by another thread.

7. The method of claim 6, further comprising:

after issuing the query command, the second thread acquiring a synchronization object from the multithreaded graphics framework;

the second thread setting a predetermined field of the synchronization object to a third predetermined value; and issuing a synchronization command associated with the synchronization object to the GPU by inserting the synchronization command into a command buffer of the GPU, wherein the second thread is notified via the synchronization object when the GPU execute the synchronization command.

8. The method of claim 7, wherein when the GPU reaches the synchronization command in the command buffer, a graphics driver associated with the GPU is configured to sets the predetermined field of the synchronization object to a fourth predetermined value to signal complete execution of the synchronization command, wherein the second thread is to monitor changes of the predetermined field of the synchronization object to determine whether the query command has been executed by the GPU.

9. The method of claim 8, further comprising:

in response to the fourth predetermined value of the predetermined field of the synchronization object, the second thread reading the query result from one or more registers of the GPU; and storing the query result in the result field of the query block.

10. A non-transitory machine-readable storage medium having machine instructions stored therein, which when executed by a machine, cause the machine to perform a method for processing queries of a graphics system, the method comprising:

receiving a query request from a client application at a multithreaded graphics framework, the multithreaded graphics framework including a first thread configured to place a plurality of graphics commands from the client application into a command queue and a second thread configured to dispatch the graphics commands from the command queue to a command buffer of a graphics processing unit (GPU) for execution;

in response to the query request, the first thread storing query information of the query request in a query block of memory that is separated from the command queue, wherein the query request is to query an operating status of the GPU, wherein query information identifies a type of query associated with the operating status of the GPU to be queried;

notifying the second thread that the query information of the query request has been stored in the query block;

in response to the notification, the second thread retrieving the query information from the query block; and the second thread issuing a query command to the command buffer of the GPU based on the query information retrieved from the query block, prior to dispatching remaining graphics commands pending in the command queue, wherein the query command is executed by the GPU prior to executing the remaining graphics commands in the command queue.

11. The machine-readable storage medium of claim 10, wherein notifying the second thread comprises inserting by the first thread a predetermined command into the command queue, wherein the insertion of the predetermined command causes an operating system hosting the multithreaded graphics framework to send an event notification to the second thread.

12. The machine-readable storage medium of claim 11, wherein storing query information in the query block comprises:

setting in a flag field a flag to a first predetermined value to indicate that the query request is pending to be completed; and specifying in a type field to indicate one of a plurality of types of query request, wherein the query command is issued based on the type of the query request and the flag.

13. The machine-readable storage medium of claim 12, wherein the method further comprises:

in response to the event notification, the second thread examining the flag of the query block to determine whether there is a pending query request;

in response to determining that the flag has been set to the predetermined value, the second thread examining the type field of the query block to determine the type of query request; and generating the query command based on the type of the query request.

14. The machine-readable storage medium of claim 12, wherein the method further comprises:

acquiring by the first thread a lock on the flag of the query block from an operating system hosting the multithreaded graphics framework, wherein the first predetermined value of the flag indicates that the lock has been acquired by another thread; and configuring the first thread to perform other operations or to be in a sleep state, while waiting for the lock to become available which indicates that the query command has been executed by the GPU.

15. The machine-readable storage medium of claim 14, wherein the method further comprises:

in response to a notification from the GPU indicating that the query command has been executed, the second thread retrieving and placing a query result in a result field of the query block; and clearing by the second thread the flag in the query block to notify the first thread via the lock that the query result is available in the query block, to allow the first thread to retrieve the query result from the query block and return the query result to the client application, wherein the second predetermined value of the flag indicates to the first thread that the lock has been released by another thread.

16. The machine-readable storage medium of claim 15, wherein the method further comprises:

after issuing the query command, the second thread acquiring a synchronization object from the multithreaded graphics framework;

the second thread setting a predetermined field of the synchronization object to a third predetermined value; and issuing a synchronization command associated with the synchronization object to the GPU by inserting the synchronization command into a command buffer of the GPU, wherein the second thread is notified via the synchronization object when the GPU execute the synchronization command.

17. The machine-readable storage medium of claim 16, wherein when the GPU reaches the synchronization command in the command buffer, a graphics driver associated with the GPU is configured to sets the predetermined field of the synchronization object to a fourth predetermined value to signal complete execution of the synchronization command, wherein the second thread is to monitor changes of the predetermined field of the synchronization object to determine whether the query command has been executed by the GPU.

18. An apparatus for processing graphics queries, comprising:

a processor;

a memory coupled to the processor;

an application programming interface (API) executed by the processor to receive a query request from a client application, wherein the query request is to query an operating status of a graphics processing unit (GPU);

a command queue maintained in the memory to store a plurality of graphics commands;

a query block of memory maintained in the memory that is separated from the command queue;

a first thread configured to place one or more graphics commands from the client application into the command queue; and a second thread configured to dispatch the graphics commands from the command queue to a command buffer of the GPU for execution, wherein in response to the query request, the first thread is configured to store query information of the query request in the query block, wherein query information identifies a type of query associated with the operating status of the GPU to be queried, and to notify the second thread that query information has been stored in the query block, wherein the second thread is configured to read the query information from the query block and to issue a query command to the command buffer of the GPU based on the query information retrieved from the query block, prior to dispatching remaining graphics commands pending in the command queue, and wherein the query command is executed by the GPU prior to executing the remaining graphics commands in the command queue.

19. The apparatus of claim 18, wherein the second thread is notified by inserting by the first thread a predetermined command into the command queue, wherein the insertion of the predetermined command causes an operating system hosting the multithreaded graphics framework to send an event notification to the second thread.

20. The apparatus of claim 19, wherein to store the query information in the query block, the first thread is configured to set in a flag field a flag to a predetermined value to indicate that the query request is pending to be completed, and specify in a type field to indicate one of a plurality of types of query requests, wherein the query command is issued based on the type of the query request and the flag.

21. The apparatus of claim 20, wherein the second thread is configured to in response to the event notification, examine the flag of the query block to determine whether there is a pending query request, in response to determining that the flag has been set to the first predetermined value, examine the type field of the query block to determine the type of query request, and generate the query command based on the type of the query request.

22. The apparatus of claim 20, wherein the first thread acquires a lock on the flag of the query block from an operating system hosting the multithreaded graphics framework, wherein the first predetermined value of the flag indicates that the lock has been acquired by another thread, and wherein the first thread is configured to perform other operations or to be in a sleep state, while waiting for the lock to become available which indicates that the query commend has been executed by the GPU.

23. The apparatus of claim 22, wherein the second thread is configured to in response to a notification from the GPU indicating that the query command has been executed, retrieve and place a query result in a result field of the query block, and clear the flag in the query block to a second predetermined value to notify the first thread via the lock that the query result is available in the query block, to allow the first thread to retrieve the query result from the query block and return the query result to the client application, wherein the second predetermined value of the flag indicates to the first thread that the lock has been released by another thread.

24. The apparatus of claim 23, wherein the second thread is configured to after issuing the query command, acquire a synchronization object from the multithreaded graphics framework, set a predetermined field of the synchronization object to a third predetermined value, and issue a synchronization command associated with the synchronization object to the GPU by inserting the synchronization command into a command buffer of the GPU, wherein the second thread is notified via the synchronization object when the GPU execute the synchronization command.

25. The apparatus of claim 24, wherein when the GPU reaches the synchronization command in the command buffer, a graphics driver associated with the GPU is configured to sets the predetermined field of the synchronization object to a fourth predetermined value to signal complete execution of the synchronization command, wherein the second thread is to monitor changes of the predetermined field of the synchronization object to determine whether the query command has been executed by the GPU.

* * * * *